Feb. 16, 1954  W. E. CATTERALL  2,669,541
EXTRACTIVE DISTILLATION
Filed Nov. 4, 1948
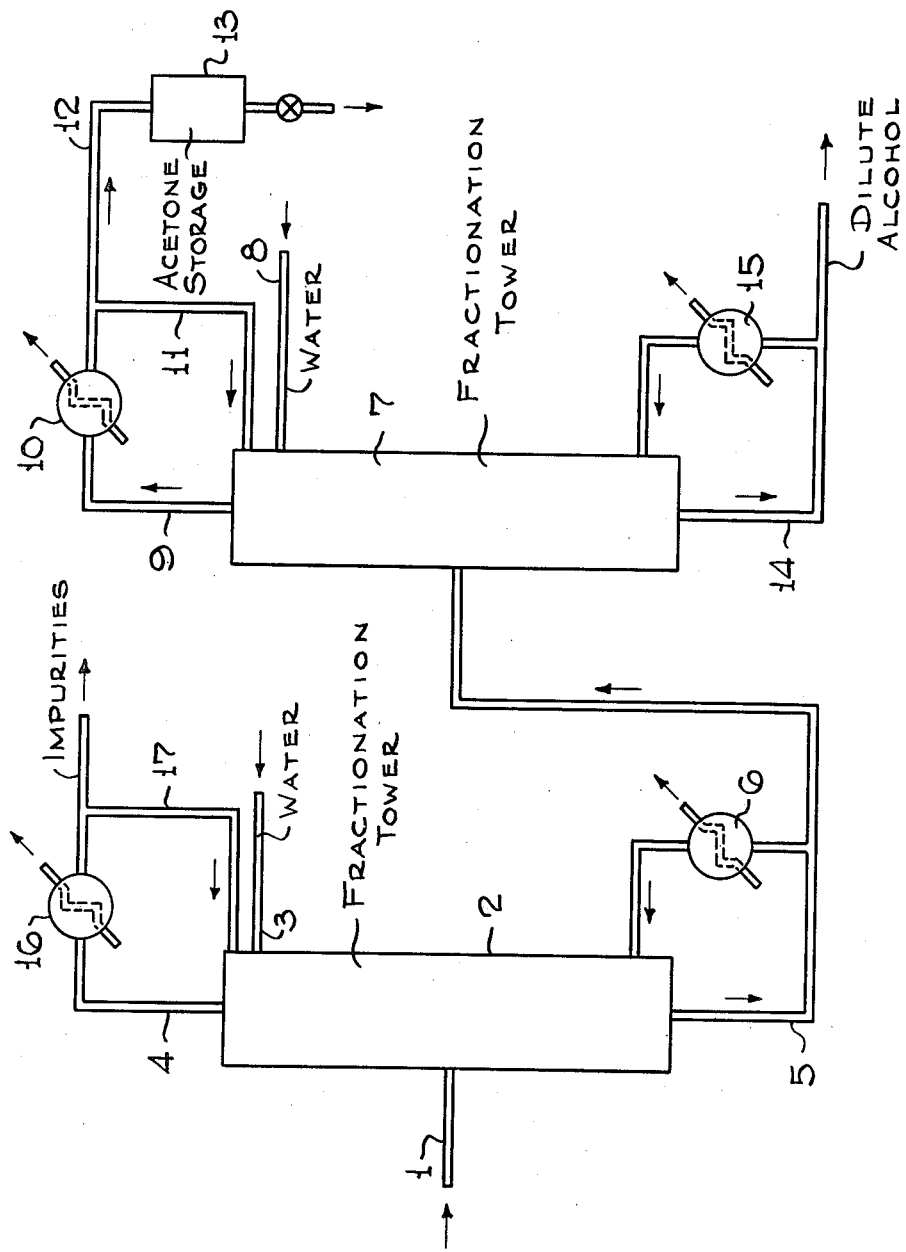
William E. Catterall  Inventor
By Henry Burk  Attorney Patented Feb. 16, 1954

2,669,541

UNITED STATES PATENT OFFICE 2,669,541

EXTRACTIVE DISTILLATION

William E. Catterall, Elizabeth, N. J., assignor to Standard Oil Development Company, a corporation of Delaware Application November 4, 1948, Serial No. 58,310

2 Claims. (Cl. 202—39.5)

This invention relates to a method of separating acetone from close boiling impurities difficult to separate by ordinary fractional distillation such as aldehyde, ether, ester, and acetal impurities, by means of extractive distillation employing water in controlled concentrations as the extractive distillation solvent.

The separation of pure acetone from a mixture of oxygenated compounds such as obtained from hydrocarbon synthesis, hydrocarbon oxidation or olefin hydration, is very difficult owing to the closeness in boiling point of the oxygenated compounds to acetone. For example, an acetone cut may contain among other components the following materials which would be considered contaminants: propionaldehyde, isopropyl ether, methyl acetate, dimethyl acetal, methanol, hydrocarbons, and even possibly mercaptans.

It is known that the separation of acetone from methanol by ordinary fractional distillation is difficult. The separation has required a treatment of the mixture with aqueous solutions of certain salts, for example, sodium thiosulfate, which are believed to form an association with one of the components thereby breaking up the constant boiling mixture. Such a treatment will not effectively separate acetone from the other types of close-boiling oxygenated compounds, and has other disadvantages.

According to the terms of the present invention, the crude acetone mixture is distilled in a fractional distillation zone in which an internal liquid reflux medium having a high water concentration, for example, above 60 mol per cent water, preferably above 90 mol per cent, flows countercurrently to vapors distilling from the mixture. The close-boiling neutral organic compounds except alcohols are distilled and recovered overhead while the acetone and alcohols remain in the aqueous reflux solution removed as bottoms from the fractional distillation zone. To separate methanol, if present, the dilute aqueous acetone bottoms that are freed of the close-boiling neutral oxygenated compound contaminants and hydrocarbons are fed into a second fractional distillation zone wherein the organic vapors being distilled again pass countercurrent to a liquid reflux medium of high water concentration, for example, above 50 mol per cent water, preferably 80 to 90 mol per cent.

The second fractional distillation zone contains a rectifying section in which the vapors become richer in acetone relative to methanol while water is fed to this section to form in the liquid reflux through most of this section a solution having the required water concentration above about 50 mol per cent, preferably 80 to 90 mol per cent. The acetone vapor is taken overhead while the reflux which is a dilute aqueous solution of methanol is removed as bottoms. The acetone can be taken overhead in practically anhydrous condition by using a sufficient number of plates between the top of the fractionating tower and the water injection point. The use of water as an extractive distillation solvent in the second tower is not necessary to separate any ethanol from the acetone, but it does increase the relative volatility for this separation. No advantage by adding water in the separation of isopropanol or higher alcohol from acetone is indicated.

The invention may be summarized briefly in that the crude acetone, which may or may not be an aqueous solution, is subjected to a distillation operation in which the crude acetone solution is fed to a distillation tower at a point below the top, preferably at about the midpoint of the tower, and in which water is fed to the top of the tower or at a point near the top thereof, but in all cases above the acetone feed plate, in sufficient quantity to maintain a composition above 60 mol per cent water in the liquid phase in the distillation column. The operable water concentration will vary with the particular impurities present in the acetone feed; however, the water concentration will be above 60 mol per cent water, preferably above 90 mol per cent. The water added during the distillation is sufficient to permit taking overhead all or substantially all of the neutral oxygenated compound impurities plus hydrocarbons present in the crude acetone feed except that any alcohols present will remain with the acetone to be separated as previously related.

The method of the invention will be explained with reference to the flow plan diagram illustrated in the drawing in which numeral 1 represents the crude acetone feed line to a first fractionation tower 2, which may be of conventional tower design. The required high water concentration is effected by introduction of water into the top of the tower via line 3. The water constitutes an internal liquid reflux descending countercurrent through the vapors undergoing rectification at an upper part of the tower. The vapors passing overhead via line 4 from tower 2 include the separated impurities comprising aldehyde, ether, ester, acetal and hydrocarbon impurities. The aqueous reflux reaches the bottom part of the tower and is withdrawn via line 5. Part of the bottoms is subjected to reboiling by indirect heat exchange with a heating medium in reboiler 6. A portion of the vapors passing overhead may be condensed in condenser 16 and refluxed to the tower via line 17 if desired, or the equivalent can be accomplished by injecting water through line 3 at a temperature below the boiling point of the mixture on the water injection plate to accomplish condensation of vapors on this plate. If the condensate forms two layers the water layer may be refluxed selectively.

The bottoms withdrawn from tower 2 via line 5 is passed onto a feed plate in a second fractionation tower 7 in which the vapors again pass through a rectification section above the feed plate. These vapors contact descending aqueous reflux provided by injection of water into the top of tower 7 via line 8. The water is introduced in sufficient quantity to maintain a water concentration between 50 to 99 mol per cent, preferably 80 to 90 mol per cent, at the upper part of the rectifying section of the tower. Acetone-rich vapors substantially free of any alcohol contaminants are withdrawn overhead from tower 7 via line 9, condensed and cooled in cooler 10 and passed to storage vessel 13 via line 12. A portion of the acetone condensate is returned as external reflux to tower 7 via line 11. The aqueous reflux which reaches the bottom of tower 7 is a dilute aqueous alcohol solution which is withdrawn via line 14. This bottoms liquid is subjected to reboiling by heat exchange with a heating medium in reboiler 15, or by the injection of live steam. The aqueous alcohol is withdrawn via line 14 and may be subjected to further separation treatment to recover the alcohol components thereof and to permit recycling the water if desired.

In the attached table of experimental relative volatility data of acetone to a number of other organic compounds boiling in the same range, the effect of water on the various compounds can be observed. Considering first the three alcohols shown, water strongly raises the volatility of acetone with respect to methanol, raises it slightly relative to ethanol, and lowers it slightly relative to isopropanol. Alcohols of higher molecular weight would be less polar than isopropanol, and water would reduce the volatility of acetone with respect to such alcohols.

Propionaldehyde, n-butyraldehyde, isopropyl ether, and methyl ethyl ketone show substantial increases in volatility with respect to acetone upon the addition of water. This results apparently from the fact that these materials are less polar than acetone and thus are less compatible with water; this is also indicated by their incomplete miscibility with water. It is important to note that for components which are normally lower boiling than acetone, such as propionaldehyde, the addition of any quantity of water improves the relative volatility for the separation. However, for materials higher boiling than acetone, such as n-butyraldehyde, the addition of water in limited concentration narrows the relative volatility and at a certain water concentration no separation whatever could be made. At higher water concentrations the relative volatility is reversed, and the separation again becomes possible. Thus, the most desirable water concentration obviously depends on the exact nature of the impurities to be removed. In general it is desirable to feed to the water extractive distillation a crude acetone cut from which higher boiling impurities have been removed by conventional distillation as completely as possible. It is also desirable to operate the extractive distillation tower separating non-alcohols at a very high water concentration in the liquid phase, for example, 90 to 99 mol per cent water, to insure adequate relative volatility reversal for higher-boiling non-alcohols. These high water concentrations have the further advantage that near the top of the rectification zone of the tower, where the impurities concentrate, the high water concentration helps to hold the impurities in solution; if some of the impurities form a separate liquid phase of low water concentration, the separation between impurities and acetone is more difficult than if a homogeneous water phase is maintained, since only in the water phase do the favorable relative volatility relationships exist.

It is also to be noted that at high water concentrations the three classes of compounds boiling close to acetone are ranked in the following relative volatility order: lowest, alcohols; intermediate, acetone; highest, other non-alcohols. The three types could be separated at the same water concentration, and in any desired order. That is, the non-alcohols and acetone could be separated from alcohols in the first stage, and from each other in the second stage; or the acetone and alcohols could be separated from the non-alcohols in the first stage, and from each other in the second stage. Different water concentrations in each stage can also be employed.

TABLE I

*Relative volatilities of other organic compounds to acetone*

| Compound | Approximate Water Concentration in Liquid Phase, Mol Percent | | | |
|---|---|---|---|---|
| | 0% | 80% | 90% | 95% |
| Methanol | [1]1.0 | 0.31 | 0.28 | 0.27 |
| Ethanol | 0.45 | 0.33 | 0.33 | 0.33 |
| Isopropanol | 0.43 | 0.46 | 0.56 | 0.61 |
| Propionaldehyde | 1.2 | [2]2.3 | [2]2.4 | 2.5 |
| N-Butyraldehyde | 0.54 | [2]1.4 | [2]1.5 | [2]1.65 |
| Isopropyl Ether | [1]1.0 | [2]2 | [2]2.5 | [2]3 |
| Methyl Ethyl Ketone | 0.48 | [2]1.1 | [2]1.2 | [2]1.4 |
| Methyl Acetate | [1]1.0 | [2]3 | [2]4 | [2]5 |
| N-Hexane | [1]1.0 | [2]10 | [2]35 | [2]50 |

[1] Forms binary azeotrope with acetone.
[2] Determined by comparison of experimental relative volatilities to ethanol.

Without attempting to explain the mechanism by which the desired separation occurs in the distillation column, it can be said that the process is one of vapor-liquid extraction in which the liquid contains a greater concentration of water relative to the acetone being purified than under the normal fractional distillation conditions in the absence of the considerable amount of water internal reflux. It is evident from the results obtained that the water employed within the limits specified increases the effective vapor pressure of the impurities in comparison with the acetone being purified thus allowing the impurities to pass overhead from the distillation zone. The temperature of the crude acetone fed to the fractional distillation tower is preferably close to the temperature of the liquid on the plate at the point of addition of the feed although it may be lower to partially condense vapors ascending to the feed plate. For continuous efficient operation, water must be added continuously near the top of the column while the crude acetone being purified is continuously fed into the column at a lower point and while sufficient heat is provided to afford distillation throughout the column. The feed stream may be preheated to a temperature close to that of the internal liquid reflux under equilibrium boiling conditions at the point of introduction. The preheated feed stream may be liquid, partially vaporized, or completely vaporized when introduced into the fractionation tower. Vapors of acetone and the impurities pass upwardly through the distillation zone in contact with descending internal liquid water reflux under equilibrium reboiling and refluxing conditions. With adequate concentrations of water supplied as reflux, the impurities to be isolated distill overhead from the fractional distillation zone, while the acetone, in conjunction with any alcohols present, is removed from the bottom of the tower as an aqueous solution.

In using the high water concentration refluxes, some substances may be included in the water such as salts, e. g., phosphates, acetates, chlorides. Such substances frequently alter the relative volatilities between individual organic compounds in water solution. Even when no favorable effect is obtained on the relative volatility between individual organic compounds, the addition of highly polar compounds such as salts is advantageous because it generally increases the relative volatility between water and organic compounds. This effect reduces the heat consumption of the distillation by reducing the water content of the vapor stream in contact with a liquid reflux of given water concentration.

What is claimed is:

1. The method of separating acetone from a mixture thereof with n-butyraldehyde, at least one non-alcoholic impurity (A) selected from the group consisting of propionaldehyde, methyl acetate, dimethyl acetal, isopropyl ether and low boiling saturated aliphatic hydrocarbons, and at least one alcoholic impurity (B) selected from the group consisting of methanol, ethanol and isopropanol which comprises continuously feeding the mixture to a fractional distillation zone at an intermediate point thereof, continuously adding sufficient water to the distillation zone at a point substantially above the mixture feed point to maintain an internal liquid water reflux having a water content in the range above 80 mole percent below the point of addition of the water, distilling from the acetone feed mixture a vaporous mixture comprising n-butyraldehyde and the impurities wherein the distilled vaporous mixture flows countercurrent to the aqueous liquid reflux, withdrawing n-butyraldehyde and impurity A as a distillate from the distillation zone and removing an aqueous solution of acetone and impurity B as bottoms from the fractional distillation zone.

2. A process according to claim 1 in which the water content of the reflux is maintained in the range above 90 mole percent.

WILLIAM E. CATTERALL.

References Cited in the file of this patent

UNITED STATES PATENTS

| Number | Name | Date |
| --- | --- | --- |
| 1,929,901 | Ricard et al. | Oct. 10, 1933 |
| 2,179,991 | Bright et al. | Nov. 14, 1939 |
| 2,198,651 | Bludworth | Apr. 30, 1940 |
| 2,283,911 | Brant et al. | May 26, 1942 |
| 2,290,442 | Metzl | July 21, 1942 |
| 2,290,636 | Deanesly | July 21, 1942 |
| 2,321,748 | Hopkins | June 15, 1943 |
| 2,379,110 | Souders | June 26, 1945 |
| 2,514,966 | Pierotti et al. | July 11, 1950 |
| 2,514,967 | Pierotti et al. | July 11, 1950 |
| 2,551,593 | Gilliland et al. | May 8, 1951 |
| 2,551,625 | Morrell et al. | May 8, 1951 |

OTHER REFERENCES

Horsley: "Table of Azeotropes and Non-Azeotropes," Analytical Chemistry, vol. 19, pages 508–511, August 1947.